Jan. 31, 1967     W. F. VIA, JR     3,301,390
RUPTURABLE DIAPHRAGM
Filed Oct. 11, 1965
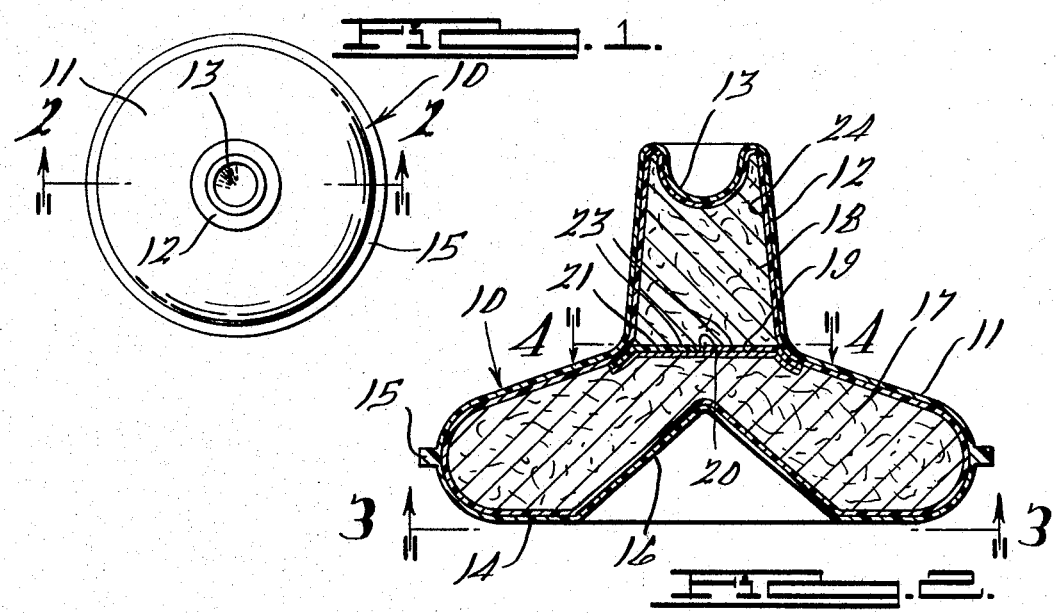
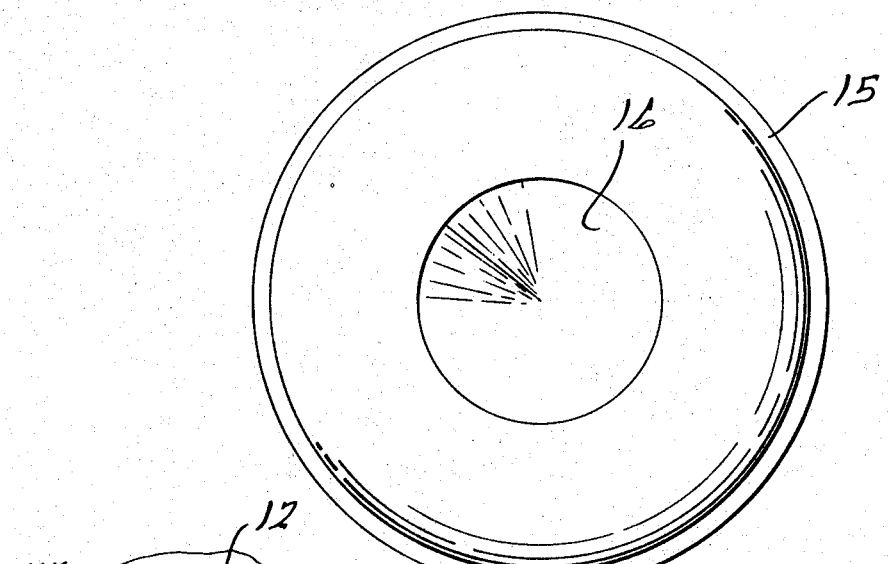
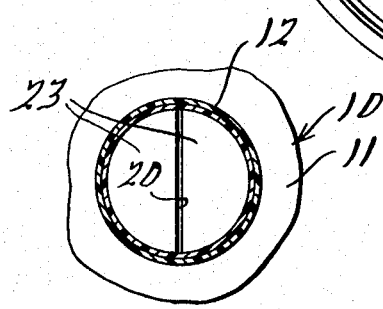
INVENTOR.
William F. Via, Jr.
BY
Harness, Dickey & Pierce
ATTORNEYS.

United States Patent Office 3,301,390
Patented Jan. 31, 1967

3,301,390
RUPTURABLE DIAPHRAGM
William F. Via, Jr., 450 Allard Road,
Grosse Pointe, Mich. 48236
Filed Oct. 11, 1965, Ser. No. 494,759
5 Claims. (Cl. 206—47)

This invention relates to containers and particularly to a multi-compartment container having a rupturable diaphragm between the compartments.

The present invention is an improvement made on the container illustrated, described and claimed in the patent to W. F. Via, Jr., No. 3,100,045, issued August 6, 1963, for Mixing Containers. The invention pertains to a rupturable diaphragm located between the compartments of a container which is impervious to the passage of the material within the compartments from passing from one to the other side thereof. The diaphragm is made from a thin sheet of metal which is imprevious to the passage of any material therethrough and is laminated to one or two pieces of plastic sheet material which provides a slot at the center of the diaphragm substantially across a diameter thereof. The plastic sheet is bonded to the sheet of thin metal or foil so that the former can be bonded to the material of the container by heat sealing, sonic sealing and the like. When the materials of the compartments are to be mixed, a rod may insert in one compartment which telescopes as the rod is moved to engage the diaphragm which is readily ruptured thereby. The rod passes through the slot in plastic sheets which stretches as the metal is ruptured. All of the metal or particles there will remain adhered to the plastic sheet material and will not be mixed with the comparament material when thoroughly mixed by the movement of the rod and diaphragm parts out of contact with the surrounding air.

Accordingly the main objects of the invention are: to provide a rupturable diaphragm between two compartments which is ruptured by the insertion of a rod therethrough without requiring excessive force or the production of particles which would intermingle with the mixed material; to bond a sheet of metal foil to a slotted sheet of plastic material which is sealable to the material of the container and which separates to permit the rupture of the metal sheet; to secure a rupturable diaphragm between a pair of compartments of a container which is impervious to the passage of either material therethrough and which is readily ruptured to prevent the mixing of the materials out of contact with the air, and in general to provide a rupturable diaphragm between a pair of compartments of a container which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a planned view of a container having a rupturable diaphragm embodying features of the present invention;

FIG. 2 is an enlarged section of the structure illustrated in FIG. 1, taken from the line 2—2 thereof;

FIG. 3 is a bottom view of the structure illustrated in FIG. 2; and

FIG. 4 is a sectional view of the structure illustrated in FIG. 2, taken on the line 4—4 thereof.

The container having the rupturable disc of the present invention embodied therein is illustrated in FIGS. 1 to 4 by way of an example. The container 9 is made from two plastic parts, an upper part 10 having an inverted dish shaped portion 11 and a conical inverted portion 12 which preferably has a telescoped end section 13. An upwardly presenting dish shaped portion 14 of the container has an edge lip which mates with an edge lip of the portion 11 and is sealed together to form the ridge 15, as illustrated in FIG. 2. The walls of the container are made of laminated material so as to be impervious to the passage of air, liquid or the contained material which might otherwise become contaminated or otherwise spoiled. Preferably, the dish shaped portion 14 has an inverted conical section 16 which aids in thorough mixing the two materials of the compartments 17 and 18 which are separated by the rupturable partition 19 of the present invention.

The rupturable disc or partition 19 is also a laminate being made from a thin sheet of metal 21 bonded to adjacent strips of a plastic sheet material 23 which provide a diametrical 20. The sheet materials are substantially abutting and are bonded to the foil-like metal sheet 21 in all areas to prevent separation when ruptured. The thin sheet of metal is impervious to the passage of the contained material therethrough that is such as not to contaminate the contained material. When the inner layer 24 of the wall material is a polyethylene then the layer 23 would also be polyethylene so that a good bond can be obtained between the polyethylene material when sealed by heat, sonic or other well known process. When the inner layer 24 is made from Zytel 63, a Du Pont product, then the lay 23 is made of the same material for the same reason.

The compartment 18 is filled with the material to the amount illustrated in FIGURE 2 after which it is closed and sealed by the rupturable diaphragm 19. The compartment 17 is filled with the other material to be mixed with the material in the compartment 18. Thereafter the lip edges are sealed together to form the ridge 15 as pointed out hereinabove. The plies of the material forming the walls of the container and the compartments for the materials as well as the partition are impervious to liquids and gases.

When the materials in the two compartments are to be mixed, a rod is inserted into the telescoped end 13 of the compartment 18 and moved downwardly therein into engagement with a central part of the rupturable diaphragm 19 to pass through the slot in the plastic layer 23 and rupture the thin metal layer 21. The rod is advanced within the material of the chamber 17, to extend into the edges of the container portion 17 adjacent to the ridge 15 and about the inverted central conical portion 16. Upon revolving the rod, the material will be rapidly and thoroughly mixed aided by the action of the two halves of the diaphragm portion which acts as beaters moving upwardly and downwardly as the rod is revolved. The movement of the rod downwardly through the compartment 18 forces the material thereof into the chamber 17 which can expand in view of its shape so that all of the material will comingle and be completely mixed in a very short time. The mixing will occur in the absence of air since the container will remain completely sealed during the mixing operation. After the thorough mixing of the materials, the end 13 is severed and the mixed material expressed therefrom.

When two strips are abutted to form the slotted plastic layer, they may be bonded to the metal foil in a continuous operation. When slots are provided in the plastic layer, these may be made seriatim in the strips as it is advancing toward metal foil strips and moved into engagement therewith and bonded thereto. The composite strip is severed into lengths to provide the discs or partitions of the present invention. The strip of foil may be of aluminum or any other metal or material which is impervious to the passage of gases, liquids or solids therethrough but which readily ruptures when localized pressure is applied thereto. The plastic may be of any known materials to be suitable, those specified above being mentioned by way of example.

What is claimed is:

1. A rupturable partition disc for a container for dividing the container into two compartments, the disc being made of a thin sheet of metal bonded to a sheet of plastic material, the plastic material having a slot extending therethrough substantially at the center of the partition.

2. A rupturable diaphragm for separating two materials in space compartments of a container, a layer of a thin metal and a layer of sheet plastic bonded thereto, the sheet plastic material having a slot therethrough through which an element may be inserted for rupturing the metal layer, all portions of which are maintained adhered to the plastic material by the bond therebetween.

3. A rupturable partition for a container having two compartments which are separated thereby, said rupturable partition embodying a sheet of metal and two substantially abutted sheets of plastic material bonded to one side of the metal sheet, the abutted edges defining the line of rupture which occurs to the metal sheet when localized pressure is applied to the partition at said abutted edge.

4. In a container made of a plastic material having two compartments separated by a diaphragm, said diaphragm being made of a metal foil-like material impervious to the passage of the contained materials and a layer of plastic material bonded to the foil material, said plastic material having a slot therethrough which defines the line of rupture which occurs to the foil when pressure is applied to the diaphragm.

5. In a container for two different materials, disposed in two separate compartments separated by a rupturable diaphragm, said diaphragm having a foil-like metal layer bonded to abutted layers of plastic material, the line of abutment of the plastic material defining the line along which the metal will rupture when pressure is applied to the diaphragm.

References Cited by the Examiner

UNITED STATES PATENTS

| 2,576,431 | 11/1951 | White | 220—89 |
| 2,653,610 | 9/1953 | Smith | 215—6 |
| 3,158,155 | 11/1964 | Myerson et al. | 128—272 |
| 3,228,334 | 1/1966 | Oss | 220—89 |

LOUIS G. MANCENE, *Primary Examiner.*

THERON E. CONDON, *Examiner.*

J. B. MARBERT, *Assistant Examiner.*